(12) United States Patent
Galles (10) Patent No.: US 8,904,032 B2
(45) Date of Patent: Dec. 2, 2014

(54) PREFETCH OPTIMIZATION OF THE COMMUNICATION OF DATA USING DESCRIPTOR LISTS

(75) Inventor: Michael B. Galles, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1221 days.

(21) Appl. No.: 12/471,702

(22) Filed: May 26, 2009

(65) Prior Publication Data

US 2010/0306405 A1 Dec. 2, 2010

(51) Int. Cl.
*G06F 15/16* (2006.01)
*H04L 12/879* (2013.01)
*H04L 12/861* (2013.01)

(52) U.S. Cl.
CPC .............. *H04L 49/901* (2013.01); *H04L 49/90* (2013.01)
USPC .......................................... 709/234; 709/235

(58) Field of Classification Search
CPC ..................................................... H04L 49/901
USPC .......................................................... 709/234
See application file for complete search history.

(56) References Cited

U.S. PATENT DOCUMENTS

| | | | |
|---|---|---|---|
| 6,434,553 B1 * | 8/2002 | Sekiguchi et al. | 1/1 |
| 7,287,101 B2 | 10/2007 | Futral et al. | |
| 7,735,099 B1 | 6/2010 | Micalizzi, Jr. | |
| 2002/0144027 A1 | 10/2002 | Schmisseur | |
| 2006/0265552 A1 * | 11/2006 | Davis et al. | 711/137 |

* cited by examiner

*Primary Examiner* — Emmanuel L Moise
*Assistant Examiner* — Xiang Yu
(74) *Attorney, Agent, or Firm* — The Law Office of Kirk D. Williams (57) ABSTRACT

The size and location of an envelope of a data block are included in the posting to a second device of a descriptor list entry for the data block, thus allowing the second device to read the data block without having to first read the descriptor list entry. This envelope may be the same size and location of the data block, or this envelope may be larger than the data block. For example, as the size of the posted register may not be large enough to also store all of the bits required to specify the exact size and position of the data block, a larger data block envelope is defined without specifying the exact low order bits of the size and/or location of the data block envelope.

10 Claims, 6 Drawing Sheets

PREFETCH OPTIMIZATION OF THE COMMUNICATION OF DATA USING DESCRIPTOR LISTS

TECHNICAL FIELD

The present disclosure relates generally to communications and computer systems, especially packet switching systems and other devices with a network interface.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

A known technique of communicating information from a first device to a second device is through the use of a descriptor list. The first device populates a data block that is desired to be communicated to the second device. The first device updates a next entry in the descriptor list to contain the size of the data block and a pointer to its location in memory. The first device then writes the identification of the entry into a posted register in the second device, thus informing the second device of the descriptor. The second device then can retrieve the descriptor list entry, and then subsequently retrieve the data block based on the information. As the descriptor list is ordered, such as that of a ring buffer, the second device maintains a value representing the descriptor list entry last read by it, and the descriptor entry identified in the posted register represents the end of the ring buffer (e.g., latest data block to be read). Another known prior technique uses the same approach, but with the descriptor list located in the second device.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with including the size and location of a data block envelope, including the desired data block, in the posting to a second device of a descriptor list entry for the desired data block. This allows the second device to read the data block envelope without having to first read the descriptor list entry, thus saving the latency of a read operation typically across a bus to the first device. The second device reads the descriptor list entry to acquire the size and location of the desired data block. Based thereon, the desired data block can be extracted from the read data block envelope. In one embodiment, the desired data block can be extracted from the read data block envelope without first reading the descriptor list entry (e.g., they are the same size, the data block is a constant size at a constant offset within the data block envelope, the information in the posted descriptor list entry is precise, etc.). One embodiment uses an envelope larger than the data block, as, for example, the size of the posted register may not be large enough to also store all of the bits required to specify the exact size and position of the data block.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with including the size and location of a data block envelope, including the desired data block, in the posting to a second device of a descriptor list entry for the desired data block. This allows the second device to read the data block envelope without having to first read the descriptor list entry, thus saving the latency of a read operation typically across a bus to the first device. The second device reads the descriptor list entry to acquire the size and location of the desired data block. Based thereon, the desired data block can be extracted from the read data block envelope. In one embodiment, the desired data block can be extracted from the read data block envelope without first reading the descriptor list entry (e.g., they are the same size, the data block is a constant size at a constant offset within the data block envelope, the information in the posted descriptor list entry is precise, etc.). One embodiment uses an envelope larger than the data block, as, for example, the size of the posted register may not be large enough to also store all of the bits required to specify the exact size and position of the data block.

Note, the second device may not use, or only use at certain time, the data block envelope descriptor information. For example, if the second device is not configured to prefetch the data block envelope (e.g., such as an older device not updated to take advantage of this useful improvement), the second device will function properly by simply ignoring the piggy-backed data block envelope information. Additionally, the second device may dynamically use or not use the piggy-backed data block envelope information. For example, in one embodiment wherein a single register is used and references the tail of the ordered descriptor list, if there are multiple outstanding data blocks to be read, this register will contain the data block envelope information for the last data block to be read. In such case, if the second device has not stored previously provided data block envelope information, it will not have it to prefetch the data block envelope. However, one embodiment stores and uses previously provided data block envelope information to prefetch data block envelope(s) which do not correspond to the latest posted descriptor list entry.

Additionally, one embodiment uses one or more linked lists to store the ordered descriptor list. One embodiment passes the address of the next descriptor list entry, rather than or in addition to data block envelope information, when posting a descriptor list entry to a second device. The second device then can use this address to prefetch the next descriptor list entry, allowing the linked list crawling to be done more efficiently in one embodiment.

One embodiment includes an apparatus, comprising: one or more storage elements; one or more processing elements configured to store an ordered descriptor list and a plurality of data blocks in said one or more storage elements, the ordered descriptor list including a plurality of entries, each of the plurality of entries including a size value and a reference value for identifying the location of a corresponding data block of the plurality of data blocks; and a device communicatively coupled to said one or more storage elements and said one or more processing elements; wherein the device includes a storage device interface configured for retrieving one or more data blocks of the plurality of data blocks based on a value stored in posted index storage; wherein the storage device interface is configured to store an identification of only a single entry of the ordered descriptor list at a time, with this single entry identifying the last of one or more descriptors identifying data blocks of the plurality of data blocks that are ready for the device to retrieve; wherein said posted index storage is configured to store the identification of the single entry of the ordered descriptor list, a particular size, and a particular reference value; wherein the particular size and the particular reference value identify a particular data block envelope including said data block corresponding to the single entry of the ordered descriptor list; and wherein the device is configured to perform operations, including: reading the particular data block envelope without accessing the ordered descriptor list said stored in said one or more storage elements, reading the single entry of the ordered descriptor list, and extracting data of said data block corresponding to the single entry of the ordered descriptor list from the particular data block envelope based on said read single entry of the ordered descriptor list; wherein said one or more processing elements are configured to update said posted index storage.

In one embodiment, the device is configured to retrieve a specific data block corresponding to one of said one or more descriptors different than the last of said one or more descriptors after accessing the ordered descriptor list to identify said size value and said reference value of the specific data block. In one embodiment, the device is a communications device configured to communicate packets corresponding to the plurality of data blocks. In one embodiment, said posted index storage comprises a single register. In one embodiment, each of said one or more storage elements is a memory. One embodiment includes one or more data buses communicatively coupling the device to said one or more storage elements and at least one of said one or more processing elements. In one embodiment, said posted index storage comprises a single register. In one embodiment, the particular size is larger than said size value for said data block corresponding to the single entry of the ordered descriptor list. In one embodiment, the particular reference value identifies a position in said one or more storage elements prior to the beginning of said data block corresponding to the single entry of the ordered descriptor list. In one embodiment, the device is configured to retrieve a specific data block corresponding to one of said one or more descriptors different than the last of said one or more descriptors after accessing the ordered descriptor list to identify said size value and said reference value of the specific data block. In one embodiment, the device is a communications device configured to communicate packets corresponding to the plurality of data blocks.

One embodiment includes a device configured for retrieving data from memory in a different device communicatively coupled to the device, said memory configured for storing an ordered descriptor list and a plurality of data blocks, the ordered descriptor list including a plurality of entries, each of the plurality of entries including a size value and a reference value for identifying the location of a corresponding data block of the plurality of data blocks. In one embodiment, the device comprises: posted index storage configured to store an identification of only a single entry of the ordered descriptor list at a time corresponding to a particular data block, with this single entry identifying the last of one or more descriptors identifying data blocks of the plurality of data blocks that are ready for the device to retrieve; wherein said posted index storage is configured to store the identification of the single entry of the ordered descriptor list, a particular size, and a particular reference value; wherein the particular size and the particular reference value identify a particular data block envelope including said data block corresponding to the single entry of the ordered descriptor list; and one or more processing elements configured to perform operations including: reading the particular data block envelope without accessing the ordered descriptor list said stored in said memory; reading the single entry of the ordered descriptor list; and extracting data of the particular data block from the particular data block envelope based on said read single entry of the ordered descriptor list.

In one embodiment, the device is said communicatively coupled to the different device via a data bus. In one embodiment, the device is configured to retrieve a specific data block corresponding to one of said one or more descriptors different than the last of said one or more descriptors after accessing the ordered descriptor list to identify said size value and said reference value of the specific data block. In one embodiment, the device includes a communications device configured to communicate packets corresponding to the plurality of data blocks. In one embodiment, the particular size is larger than said size value for said data block corresponding to the single entry of the ordered descriptor list; and the particular reference value identifies a position in said memory prior to the beginning of said data block corresponding to the single entry of the ordered descriptor list.

One embodiment includes performing a method for communicating data from a host device to a communications device, wherein the method comprises: storing, by one or more processing elements of the host device, an ordered descriptor list and a plurality of data blocks in memory external to the communications device, the ordered descriptor list including a plurality of entries, each of the plurality of entries including a size value and a reference value for identifying the location of a corresponding data block of the plurality of data blocks; updating, by one or more processing elements of the host device, a posted index storage in the communications device with an identification of an entry of the ordered descriptor list corresponding to a particular data block, a particular size, and a particular reference value; wherein the particular size and the particular reference value identify a particular data block envelope including the particular data block; wherein the communications device includes the posted index storage configured for storing an identification of only a single entry of the ordered descriptor list at a time along with a respective particular size and a respective particular reference value; wherein said single entry identifies the last of one or more descriptors identifying data blocks of the plurality of data blocks that are ready for the communications device to retrieve; retrieving, by the communications device, the particular data block envelope without accessing the ordered descriptor list in said memory; retrieving the entry of the ordered descriptor list; and sending one or more packets by the communications device; wherein at least one of said one or more packets includes data of the particular data block extracted from the particular data block envelope based on said retrieved entry of the ordered descriptor list.

In one embodiment, the communications device is configured to retrieve a specific data block corresponding to one of said one or more descriptors different than the last of said one or more descriptors after accessing the ordered descriptor list to identify said size value and said reference value of the specific data block. In one embodiment, the particular size is larger than said size value stored in said memory for the particular data block. In one embodiment, the particular reference value identifies a position in said memory prior to the beginning of the particular data block stored in said memory.

Figure 1A:
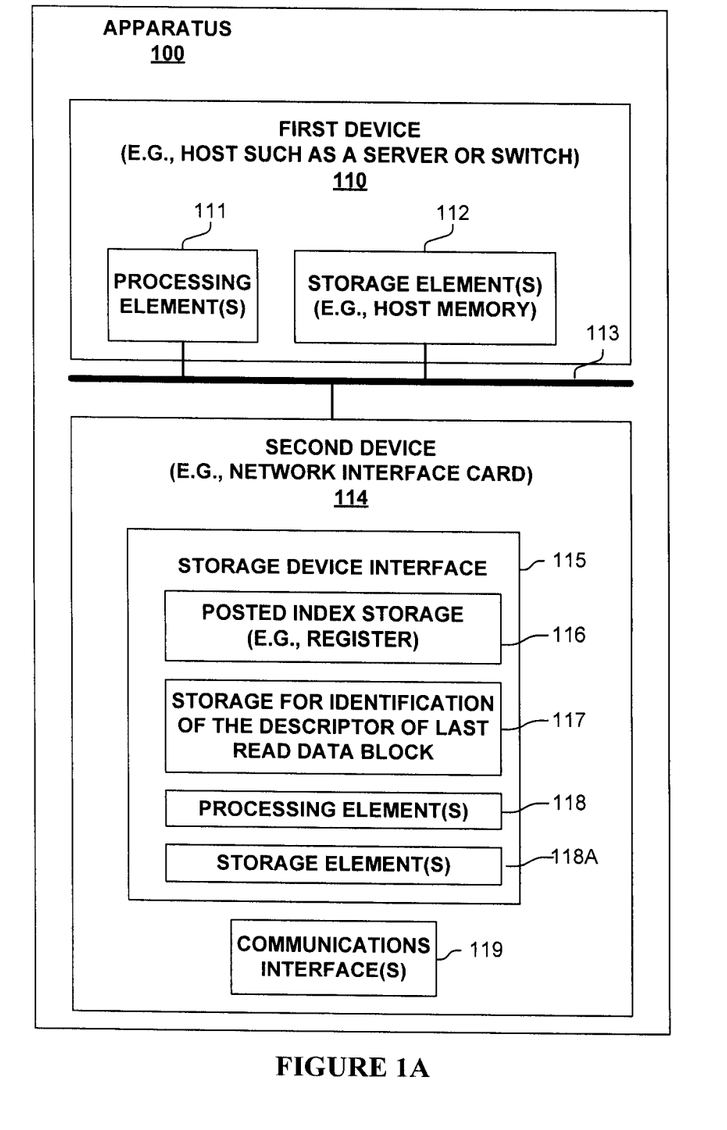
FIGS. 1A-D illustrates an apparatus operating according to one embodiment.

Expressly turning to the figures, FIG. 1A illustrates an apparatus 100 operating according to one embodiment. As shown, apparatus 100 includes a first device 110 (e.g., a host system comprising processing elements 111 and 112) and a second device 114 (e.g., a network interface card) communicatively coupled to first device 110 via one or more communications mechanisms 113 (e.g., one or more data buses), with the communications path(s) typically tailored to meet the needs of the application. In one embodiment, apparatus 100 performs one or more processes corresponding to one of the flow diagrams illustrated or otherwise described herein.

Figure 1B:
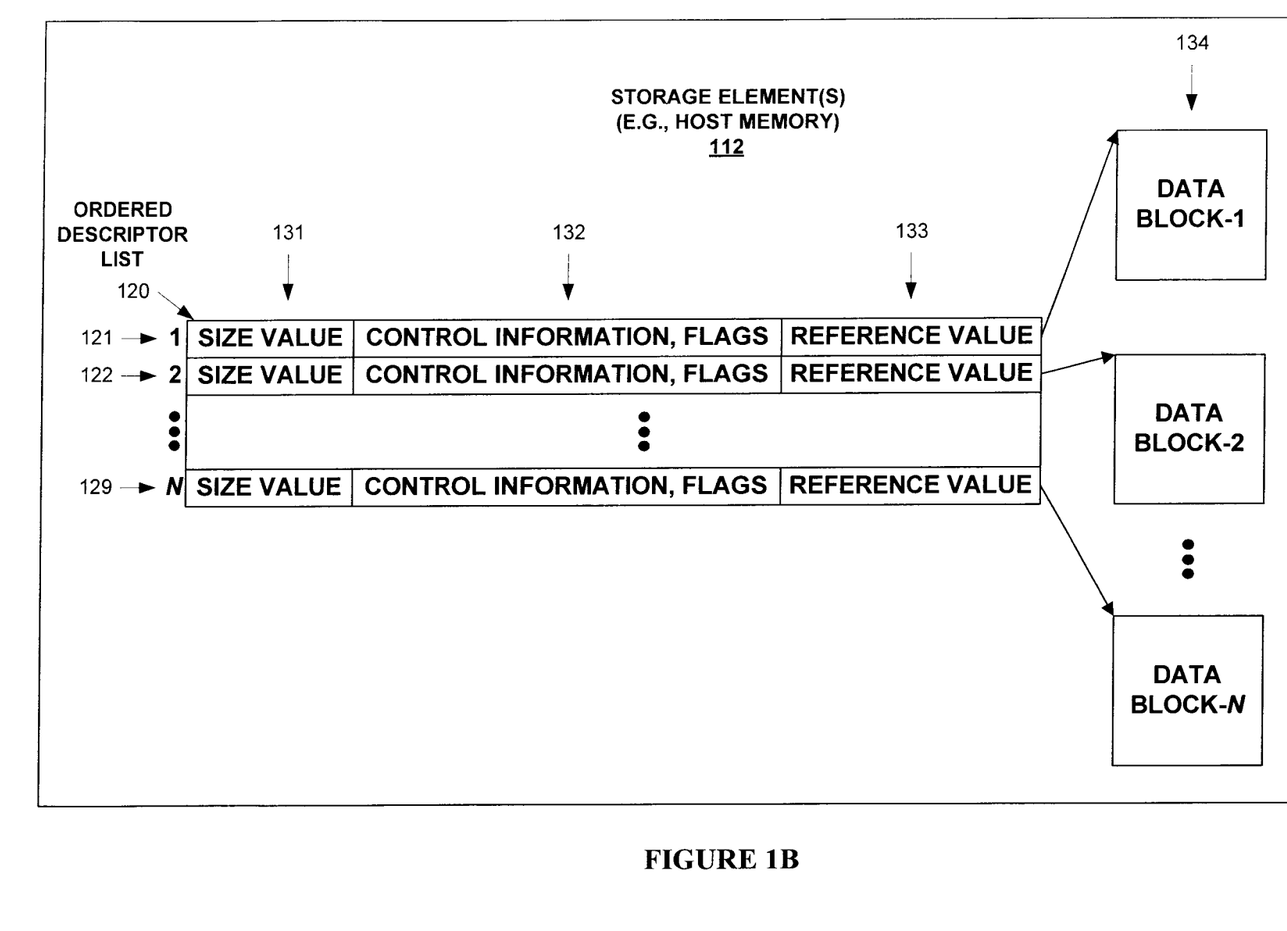

First device 110 maintains an ordered descriptor list 120 (FIG. 2) in storage element(s) 112 (e.g., host memory) to identify data blocks 134 desired to be communicated to second device 114. In one embodiment, storage elements 112 store computer-executable instructions which are executed by processing element(s) 111 to maintain the ordered descriptor list 120 and/or generate data blocks 134. As shown, ordered descriptor list 120 includes descriptor list entries 121-129, with each of which including a size value (131) of a particular data block 134, control information and flags (132), and a reference value (133) (e.g., a pointer) to the particular data block 134.

As shown in FIG. 1A, second device (e.g., a network interface card) includes a storage device interface 115 configured for accessing storage elements 112 (e.g., data block envelopes, data blocks, and ordered descriptor list entries 121 stored therein) in first device 110. As shown, storage device interface 114 includes: posted index storage (e.g., a register, memory location) configured for storing the identification (e.g., index) of a single ordered descriptor list entry (121-129 of FIG. 1B); storage 117 (e.g., a register, memory location) for storing the identification (e.g., index) of the last single ordered descriptor list entry read from storage element(s) 112; processing element(s) 118 for performing operations; and storage element(s) 118A, which in one embodiment, store computer-executable instructions which are executed by processing element(s) 118.

When first device 110 has a data block 134 to send to second device 114, it writes posted index 150 (FIG. 1C) to posted index storage 116 (FIG. 1A). In one embodiment, ordered descriptor list 120 is maintained as a ring buffer, with the value in posted index 150 identifying the current end of the ring buffer. Second device 114 uses storage (117) to maintain the position within ordered descriptor list 120 that it last accessed, as second device 114 may operate at a rate slower than the posting of data block rate by first device 110. In one embodiment, second device 114 is a network interface card including communications interface(s) 119 for sending packets created from data blocks 134 read from first device 110.

Figure 1C:
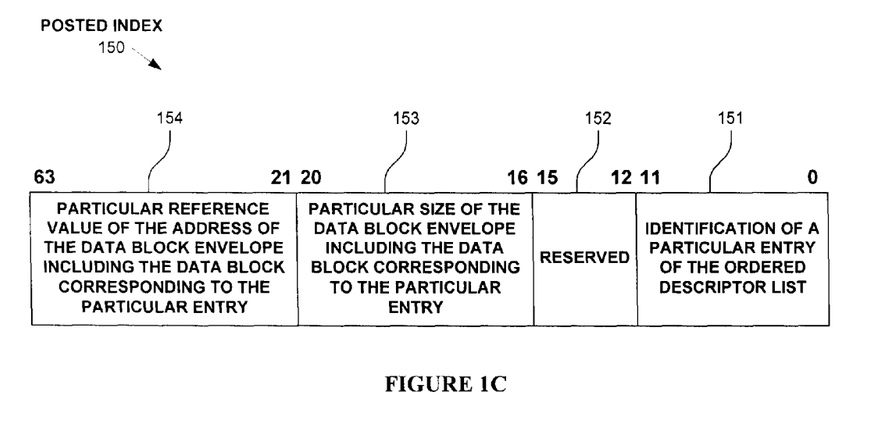

Turning to FIG. 1C, one embodiment uses shown posted index 150, which includes: an identification 151 (e.g., index) of a particular entry (121-129) of ordered descriptor list 120;

reserved bits 152 (e.g., for expanding the length of field 151); particular size 153 of the data block envelope including the desired data block; and particular reference value 154 of the location in memory of the data block envelope including the desired data block.

In a known prior system, a sixty-four bit posted index is used to specify the index of the ordered descriptor list, with the low-order twelve or sixteen bits used to identify the index of the ordered descriptor list. Therefore, posted index 150 is backward compatible with such a system, as it would simply ignore the data envelope data provided in fields 153 and 154. Of course, this prior system would not be able to take advantage of reducing the data transfer latency by retrieving the data block (included in the data block envelope) without first reading the corresponding descriptor list entry.

Figure 1D:
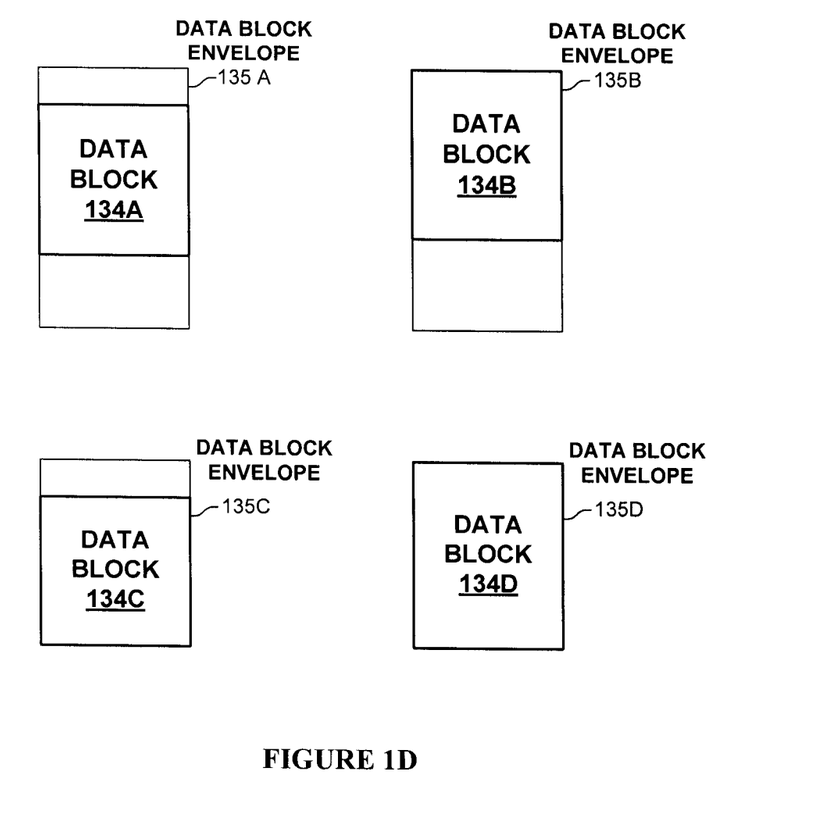

In one embodiment, the data block envelope includes the desired data block, such as shown by four examples in FIG. 1D. In the first example, data block envelope 135A includes data block 134A, which has different starting and ending positions and a different size than data block envelope 135A. In the second example, data block envelope 135B includes data block 134B, which has a same starting position, different ending position, and a different size than data block envelope 135B. In the third example, data block envelope 135C includes data block 134C, which has a different starting position, same ending position, and a different size than data block envelope 135C. In the fourth example, data block envelope 135D includes data block 134D, which has a same starting position, same ending position, and a same size as data block envelope 135D.

It is desirous to use the model of the example where data block envelope 135D has the same size and location as data block 134D. However, returning to FIG. 1C, one embodiment uses a posted index 150 that has less than enough bits to store the exact location (154) and/or size (153) of the desired data block. A data block envelope, which can be described using less bits than would be required to specify the exact location and size of the desired data block, is used. One embodiment uses a ceiling function on the actual size of the data block to determine the size of the data block envelope. For example, in one implementation, the size (153) of the data block envelope is the ceiling((sizeof(data block)>>5), 32), which is the size of the data block envelope in cache lines up to a maximum of 1024 bytes. One embodiment simply takes the high-order bits of the address of the desired data block to determine the address of the data block envelope. For example, in one implementation, the address (154) of the data block envelope is: address[47:5] of the data block. Of course, different embodiments can determine these values differently. Also, one embodiment derives posted index 150 simply by shifting and OR'ing the values for fields 151, 153 and 154.

Figure 2A:
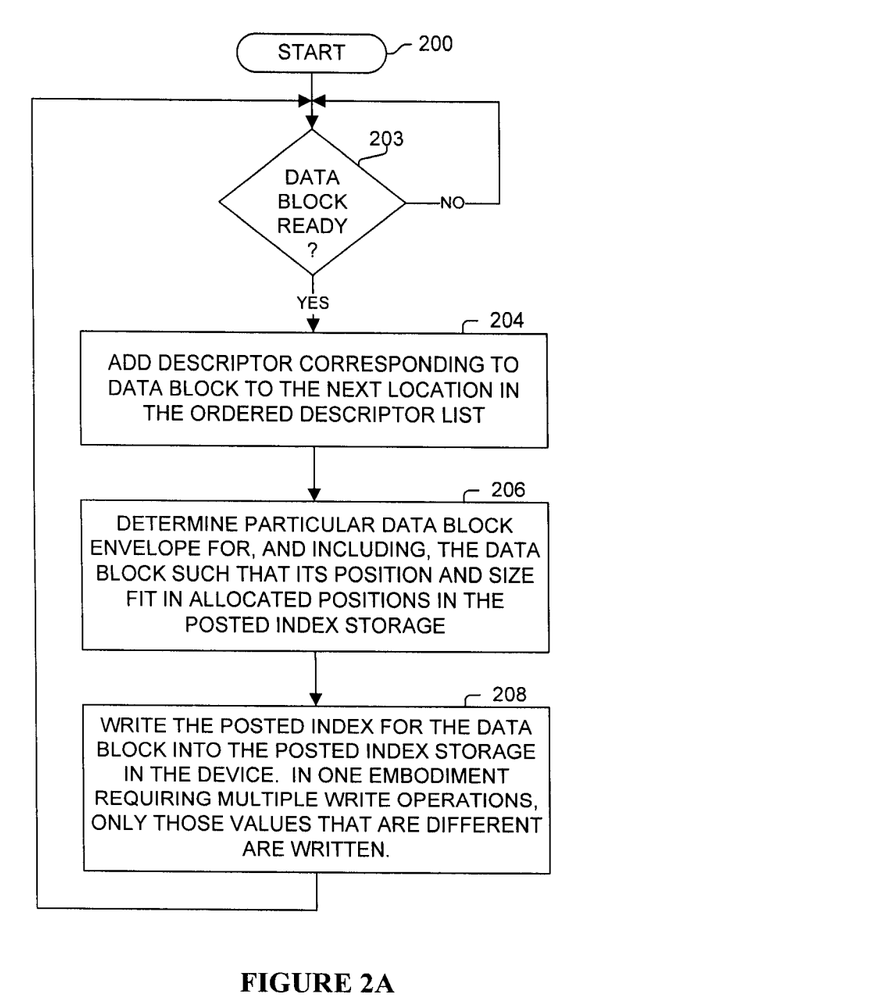
FIGS. 2A-B illustrates processes performed in one embodiment.

FIG. 2A illustrates a process performed by a first device, in one embodiment, for communicating data blocks to a second device. Processing begins with process block 200. As determined in process block 203, when a data block is ready to be communicated to the second device, processing proceeds to process block 204, wherein a descriptor corresponding to the data block is added to the next location in the ordered descriptor list. Next, in process block 206, the data block envelope for the data block is determined such that the data block can be described given the number of bits allowed in the posted index data. In process block 208, the posted index corresponding to the data block and created ordered descriptor list entry is posted to the second device. Note, if, for example, if this operation requires two write operations, such as for writing two thirty-two bit words of a sixty-four bit posted index and one of them is the same as that previous posted, only the different one is typically written. For example, in one embodiment, the high-order thirty-two bits of the address (154 of FIG. 1C) may be the same for consecutively used data block envelopes. Processing returns to process block 203.

Figure 2B:
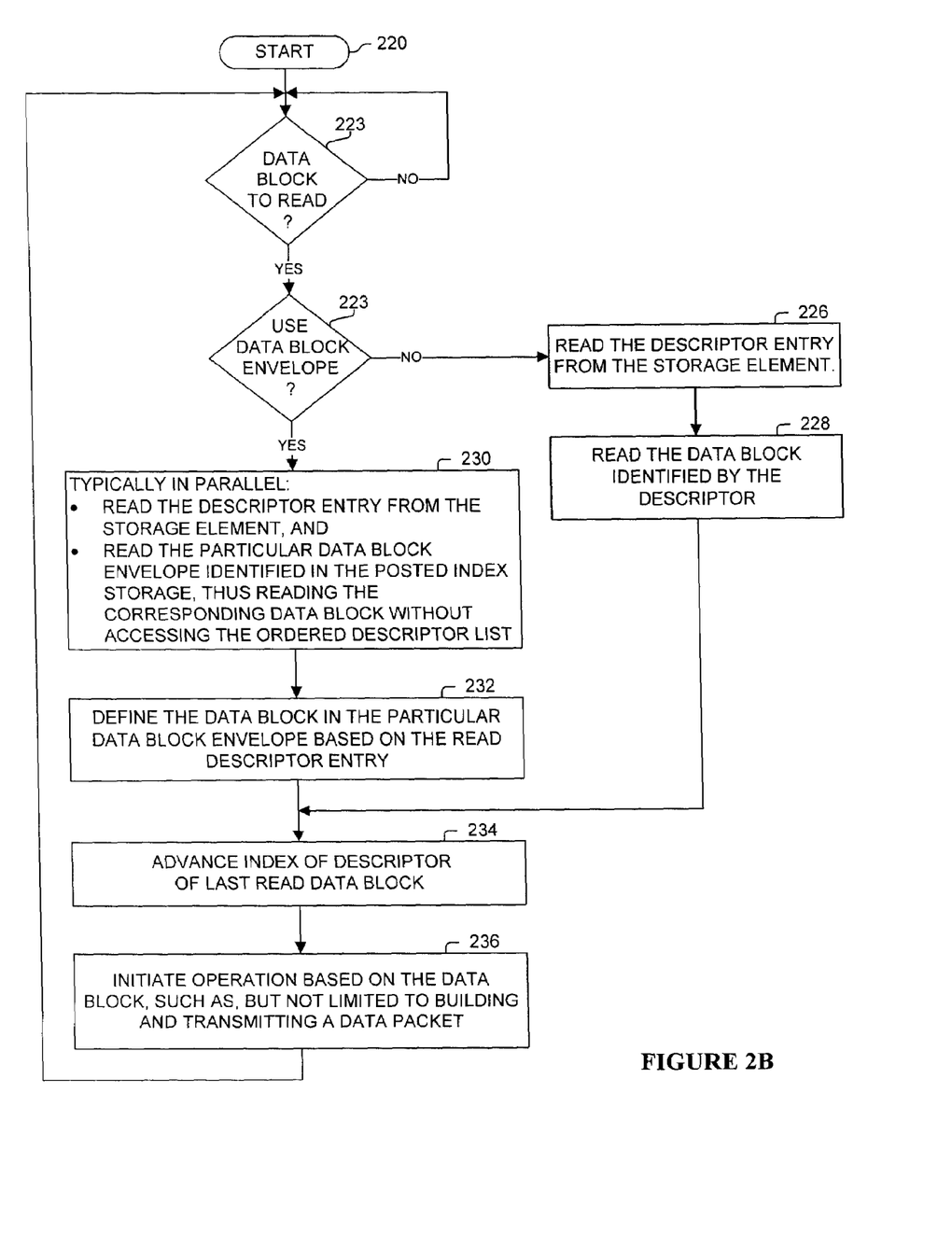

FIG. 2B illustrates a process performed by a second device, in one embodiment, for retrieving data blocks from a first device. Processing begins with process block 220. In process block 223, a determination is made as to whether or not there is a data block to read, e.g., which can easily be determined based on the identifications/indexes of the ordered descriptor list entries in the posted index storage (116 of FIG. 1A) and the last read storage (117 of FIG. 1A). If there is a data block to retrieve, then as determined in process block 223, if a data block envelope is specified in posted index and is to be used, then processing proceeds to process block 230. In process block 230, the particular data block envelope is retrieved (e.g., actually read and received, or the initiation of the read operation), typically based on the location and size information located in the posted index storage, without first accessing the corresponding ordered descriptor list entry in the first device. Additionally, the corresponding ordered descriptor list entry is retrieved from the first device and used to define, in process block 232, the data block within the retrieved data block envelope. In one embodiment, these read operations are performed in parallel. In one embodiment, the read of the ordered descriptor list entry is initiated before that of the data block envelope; while in one embodiment, the order of these reads is reversed or possibly varies. Note, in one embodiment wherein the data block and the data block envelopes are the same, both read operations are not performed.

Otherwise, as determined in process block 223, the posted index storage does not include data block envelope information or is not to be used, and then in process block 226, the corresponding ordered descriptor list entry is first retrieved; and based on information contained therein, the data block is retrieved in process block 228. Next, in process block 234, the last read data block information is advanced to reflect the read data block. In process block 236, an operation is initiated (as typically this data transfer process does not need to wait until the operation is completed) based on the information contained in the read data block, such as, but not limited to building and transmitting a packet including at least some information contained in the read data block. Processing then returns to process block 223.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:
1. An apparatus, comprising:
a first device including: first memory and one or more first processors configured to store an ordered descriptor list and a plurality of data blocks in said first memory, with the ordered descriptor list including a plurality of ordered descriptor list entries with each of the plurality of ordered descriptor list entries including a size value and a reference value for identifying the location of a corresponding one or more data blocks of the plurality of data blocks; and a second device, communicatively coupled to said first device, with the second device including: a storage device interface configured to retrieve from said first memory one or more particular data blocks of the plurality of data blocks identified in a posted index storage entry which corresponds to a particular ordered descriptor list entry of the ordered descriptor list received from the first device and stored within the storage device interface as the posted index storage entry, wherein said configuration to retrieve said one or more particular data blocks includes reading a data block envelope larger than and encompassing said one or more particular data blocks and then extracting said one or more particular data blocks from the data block envelope;

wherein the posted index storage entry includes a pointer to the particular ordered descriptor list entry, a data block envelope size and a data block envelope reference value identifying the size and position of the data block envelope in said first memory; and wherein the second device is configured to read the data block envelope based on the data block envelope size and the data block envelope reference value without reliance on data acquired by reading the particular ordered descriptor list entry, and to read the particular ordered descriptor list entry based on the pointer, and to extract said one or more particular data blocks from the data block envelope based on the size value and the reference value of said read particular ordered descriptor list entry.

2. The apparatus of claim 1, wherein the second device is a network interface card.

3. The apparatus of claim 1, wherein the second device is configured to store only one posted index storage entry at a time.

4. The apparatus of claim 3, wherein said posted index storage entry is stored in a single register.

5. The apparatus of claim 1, comprising one or more data buses communicatively coupling the second device to said first memory and at least one of said one or more first processors.

6. The apparatus of claim 1, wherein the data block envelope reference value identifies a position in said first memory prior to the beginning of said one or more particular data blocks.

7. The apparatus of claim 1, wherein the second device is configure to said read the data block envelope and the particular ordered list entry in parallel.

8. A method for communicating data from a host device to a communications device external to the host device, wherein the method comprises:

storing, in memory external to the communications device by one or more processing elements of the host device, a plurality of data blocks and an ordered descriptor list identifying data blocks of the plurality of data blocks that are ready for the communications device to retrieve, with the ordered descriptor list including a plurality of entries identifying the location in said memory and size of a corresponding one or more data blocks of the plurality of data blocks;

updating, by one or more processing elements of the host device, a posted index storage entry in the communications device to include (1) a pointer to a particular ordered descriptor list entry of the ordered descriptor list corresponding to one or more particular data blocks, and (2) a data block envelope description of a data block envelope in said memory larger than and encompassing said one or more particular data blocks;

retrieving, by the communications device based on the data block envelope description in the posted index storage entry, the data block envelope without reliance on information acquired by reading the particular ordered descriptor list entry;

reading, from said memory by the communications device based on the pointer, the particular ordered list entry;

extracting, by the communications device based on information included in the particular ordered list entry, said one or more particular data blocks from the particular data block envelope.

9. The method of claim 8, wherein said operations of retrieving the data block envelope and reading the particular ordered list entry are performed in parallel.

10. The method of claim 8, wherein data block envelope description consists of a size value and a reference value.

* * * * *